United States Patent

Smith

[15] 3,649,319

[45] Mar. 14, 1972

[54] BONDED PLASTER OF PARIS BANDAGE

[72] Inventor: David F. Smith, 120 Grove St., Bay Head, N.J. 08742

[22] Filed: June 1, 1970

[21] Appl. No.: 42,446

[52] U.S. Cl. ............................106/111, 106/114, 106/115, 128/91
[51] Int. Cl. ..............C04b 11/16, A61f 13/04, A61l 15/07
[58] Field of Search ..........................106/111–115; 128/91

[56] References Cited

UNITED STATES PATENTS

| | | | |
|---|---|---|---|
| 2,557,083 | 6/1951 | Eberl | 106/114 |
| 3,294,087 | 12/1966 | Smith | 106/114 |

*Primary Examiner*—James E. Poer

[57] ABSTRACT

The product yielded by polymerization and hydrolysis of monomeric vinyl acetate provides improved bonding of plaster of Paris bandages to yield fast-setting bandages with low-plaster loss that make high-strength, moisture-resistant casts.

12 Claims, No Drawings

BONDED PLASTER OF PARIS BANDAGE

A plaster of Paris bandage, as used in orthopedics to make casts to provide needed immobilization and/or support of parts of the human or animal body, normally comprises powdered plaster coated upon a porous, flexible, inert backing material such as gauze or crinoline. The modern product contains materials to control the set after it is wet in water preparatory to making a cast and an adhesive to prevent excessive loss of plaster in storage and handling before use and during wetting and squeezing out excess water. Specifications and methods of using and testing such bandages are published in Federal specification GG-B-101d and in Military Medical Purchase Description No. 9, Sept. 26, 1963 and revisions thereof.

While normally such products contain so-called adhesives or bonding-agents such as cooked starch, dextrin and cellulose ethers, these materials are moisture-sensitive and, being derived from plant sources, are variable in properties and unstable. They only weakly bond the plaster particles to themselves and especially to the backing, in the finished cast as is evidenced by the fact that the dry cast can be crushed layer by layer in a sensitive compression testing machine (see Neviaser and Eisenberg, American Journal of Surgery, vol. 93, May 1957, pp. 870–1). Thus, in the cast the backing contributes little to toughness, strength or rigidity. While certain aldehydetriazene resins do apparently exhibit stronger bonding and thus provide the stronger cast that results from its more or less monolithic structure, wider use of such material has elicited serious complaints of skin irritation or allergic response on the part of both patient and operator. They are also much more costly and tend to set and develop strength in the cast more slowly. For these reasons they have not achieved extensive use.

It is an object of this invention to provide improved adhesives or bonding agents for plaster of Paris bandages, that contribute to greater uniformity, increased cast-strength and moisture-resistance without increased cost or other undesirable characteristics mentioned. Other objects will appear hereinafter.

The adhesives of the present invention comprise polyvinyl alcohol and mixtures thereof with minor proportions of polyvinyl acetate. More particularly they are incompletely to substantially completely hydrolyzed polyvinyl acetate. These products are produced by polymerizing vinyl acetate in the presence of a catalyst such as platinum and subsequently hydrolyzing in alkaline solution. The alkaline agent may be NaOH. The reactions are carried out in a solvent such as methanol. Subsequently the solvent is recovered and the product washed with water to remove salts such as sodium acetate. The degree of hydrolysis may vary from 85 to substantially 100 percent. The degree of polymerization is indicated by the viscosity of from 3 to 70 centipoises as measured in 4 weight percent aqueous solution at 20° C. by the Hoeppler falling-ball method. (For a Hoeppler viscosimeter, see E. H. Sargent and Co., Springfield, N.J., catalog edition 109, p. 1050.) The pH varies from 5 to 7. While normally polyvinyl acetate as used for bonding plaster of Paris bandages, is practically completely water-insoluble, in my adhesives larger proportions of unhydrolyzed polyvinyl acetate increase the solubility. Thus mixtures of unhydrolyzed and hydrolyzed polyvinyl acetate produced as described to make my adhesives, appear to have properties different from those of such other mixtures otherwise made. Polyvinyl alcohol is normally thought of as water-soluble and is used in the form of a water-soluble film, while in my adhesives, the more highly hydrolyzed material, which would be thought of as mostly polyvinyl alcohol, is less readily soluble in water. It is further known that heating further insolubilizes polyvinyl alcohol.

Products with lower degree of hydrolysis are not only more water-soluble but are more water- or moisture-sensitive and show less adhesion to plaster and gauze. The higher the viscosity the higher the adhesion to gauze and plaster, also, and the better the moisture-resistance. A preferred material has a degree of hydrolysis of 98 to 100 percent and a viscosity of 25 to 31 c.p.s. However material with 87 to 89 % hydrolysis and viscosity of 19 to 23 c.p.s. is very useful and superior to previous adhesives. For best adhesion to gauze and plaster and best moisture-resistance, I use completely hydrolyzed material of 70 c.p.s. viscosity; although completely hydrolyzed material of 25 to 35 c.p.s. viscosity is easier to process.

My adhesives do not slow the set or development of the strength of a cast, unlike many other adhesives and they are unique in not exhibiting undesirable toxic, irritating or allergenic properties. They also impart a desirable plastic feel to the wet bandage, and they are compatible to a reasonable extent with the above-mentioned previous plaster of Paris bandage adhesives and can thus be used in combination therewith-- in contrast to the polyvinyl acetate previously used (see Eberl et al., U.S. Pat. No. 2,655,148, Oct. 13, 1953) which is not only insoluble in water but is not even wettable or swellable and can thus interfere with the required rapid wetting of the bandage (see Eberl et al, Col. 5, claim 1, line 39 ff.). While my adhesives, especially those more highly hydrolyzed and of higher viscosity, are less readily soluble in water (thus making a better adhesive for the wet bandage) and are much better adhesives for plaster and gauze, they are still readily wet by water so that they do not interfere with wetting of the bandage preparatory to making a cast-- also a unique property for a good wet binder.

The following Examples illustrate the application of my adhesives:

EXAMPLE 1

18 g. of vinyl acetate polymerized and hydrolyzed 98 to 99 percent to a viscosity of 25 to 31 c.p.s. were suspended in 114.2 grams water and heated for one-half hr. in a boiling-water bath while being stirred. This formed a clear, viscous solution which was cooled and mixed with 395.3 g. aqua ammonia (29.4 percent $NH_3$) in which were dissolved 1.4 grams grams and 17.2 g. potassium sulfate ground to pass 200 mesh U.S.Std. screen. To this mix was added 907.2 g. steam-calcined plaster of Paris (ground to pass 99 percent through a 200 mesh screen). This slurry was coated upon 32 × 28 mesh surgical gauze in amount to yield a final, dry bandage weighing 208 to 250 g. per 4 inch ×5 yard strip. The coated gauze was dried in a circulating air oven at 190° to 235° F. for 3 to 10 minutes, until the dried product, after being stored protected from moisture for a few hours showed no grittiness when wetted in water and made into a cast. Casts made from the product were smooth, plaster-loss was very small when dry and when wet and the excess water squeezed out, and the cast was well bonded, very strong, tough and moisture-resistant. The setting-time was about 4 minutes about the same as with the usual bandage made similarly but with a starch binder.

EXAMPLE 2

10.5 g. of polymerized and 98 to 99 percent hydrolyzed vinyl acetate, having a viscosity of 25 to 31 c.p.s. were suspended in 79 g. water and heated for one-half hr. in a boiling-water bath with stirring. To this cooled solution were added 125 g. 29.4 wt. percent aqua ammonia containing 0.35 g. boric acid and 4.5 g. powdered potassium sulfate. The mix was thoroughly stirred and then 350 g. of powdered steam-calcined plaster of Paris were thoroughly stirred in. This slurry was coated and dried as in Example 1 and a similar bandage was obtained.

EXAMPLE 3

90 g. of the polymerized and hydrolyzed vinyl acetate of Example 1 were similarly dissolved. To this cooled solution was added enough water to make up to a total weight of 450 g. in order to make up for loss in the heating. To this solution were added 859 g. aqua ammonia containing 2.7 g. casein and 36 g. potassium sulfate ground to 100 mesh. Then 1,800 g. steam-calcined plaster of Paris were stirred in and the slurry coated and dried as in Example 1 except the drying time was 15 min.

at 235° F. The product was similar to that of Example 1 except that the bonding was increased, the plaster loss was less, the wet plaster had a more plastic consistency and the set was about 4 ½ minutes.

EXAMPLE 4

This Example was the same as Example 3 except that 7.5 g. dextrin was stirred into the hot adhesive solution and the casein was omitted. The resulting product was similar to that of Example 3 but the set was 3 minutes.

Examples 1 and 3 use the in-process set-inhibitor of U.S. Pat. No. 3,282,265; Example 2 that of U.S. Pat. No. 3,294,087 and Example 4 that of the present inventor's application Ser. No. 633,708 which has now passed to issue.

While nominally my adhesives are designated as mixtures of polyvinyl acetate and polyvinyl alcohol, it appears that they do not possess the usual properties of either material alone. It appears that they affect each other's properties. As a matter of fact their properties can be duplicated by intimately mixing by means of a colloid mill, the two materials, the polyvinyl acetate appearing to act as a dispersing or emulsifying agent for the cold-water insoluble polyvinyl alcohol. However the properties of the fully hydrolyzed material appear to have been affected by the method of preparation.

In place of the adhesives used in the above Examples, I may use the above-described polymerized and hydrolyzed vinyl acetate with the various degrees of polymerization and hydrolysis stated. I may also use similarly polymerized and hydrolyzed vinyl propionate or butyrate the corresponding mixtures of ester and alcohol of which are more moisture-resistant than the acetate-alcohol mixtures.

My adhesives may also be used with up to 15 percent be weight of cooked corn, white potato, sweet potato or tapioca starch or of dextrin; or these materials may be used with up to 15 wt. percent of my adhesives. In the case of ethylated starch (starch reacted with ethylene oxide), which has the advantage over ordinary starch of having lower viscosity and making clearer, stronger films, it may be mixed with my adhesives in any proportion from 0 to 100 percent.

I may use my adhesives in amounts from about 1 to 15 percent of the weight of plaster, although I prefer 1 to 5 percent and, for the purpose of merely reducing the loss of plaster from the dry or wet bandage, only about 1 percent will suffice. Adhesives of lower viscosity may be used in the higher proportions.

The powdered plaster of Paris as well as the potassium sulfate used as set-accelerator (if it is not dissolved in the slurry liquid) must be at least as fine as to pass a 100 mesh U.S. Standard screen in order to avoid a gritty feel in the wet bandage as the cast is formed. It should also be pointed out that when I use the higher viscosity adhesive and/or higher proportions of adhesive, I may use a slurry formulation (for example, like that of Example 2) with more water relative to adhesive so that it may be dissolved to a less viscous solution, or I may use higher concentrations of casein or boric acid and/or ammonia in the slurry so as to permit the use of a larger amount of water relative to adhesive without unduly shortening the life of the slurry. When I use vinyl propionate or butyrate, the final viscosities of the polymerized materials with the high degree of hydrolysis normally used, are not appreciable different from those with the acetate after the salts have been washed out. In any case, where the cold adhesive solution is very viscous, it can be thinned out with the aqua ammonia before addition to the remainder of the slurry.

The amount of casein, as used in Examples 1, 3 and 4 and of boric acid as in Example 2, can be varied from about 0.1 to 1 percent of the weight of plaster of Paris and the amount of aqua ammonia from about 8 to 23 percent of the weight of ammonia plus water in the slurry liquid. The amount of potassium sulfate can vary from about 0.5 to 2.5 percent of the weight of plaster of Paris. When the casein or boric acid concentrations are low, the NH₃ concentration should be high in order to obtain long slurry life. The length of slurry life required depends upon how long the slurry must be held until the final, dry bandage is produced and this can be shorter in case a continuous as against a batch process is used.

In making a solution of my adhesives, I normally heat them with the appropriate amount of water in a boiling-water bath or by direct steam with stirring until a clear solution is produced, except for entrained air bubbles; and normally proportions of adhesive and water are used so as to yield a solution containing not over about 30 percent adhesive by weight and preferably not over about 20 % in the case of more viscous material. If the heating is done at concentration over about 30 percent, the adhesive may not satisfactorily hydrate and the solution may be so viscous as to be troublesome to handle. However the cold, viscous solution can still be satisfactorily mixed with the aqua ammonia in heavy-duty mixing equipment. It should be pointed out in this connection that my use of excess aqua ammonia as disclosed, permits use of my adhesives of 100 percent degree of hydrolysis and high viscosity (and thus of optimum moisture resistance and optimum adhesion to plaster and gauze that cannot be practical in other water-slurry processes such as that of U.S. Pat. No. 2,557,083 because the dilution required to make use of such adhesive, using water instead of ammonia gives too short slurry life unless such high amounts of ammonium caseinate or borate inhibitors are used as to leave sufficient residues in the finished bandage to undesirably slow the set.

The coating of the backing material is done in the usual manner with a knife or roll coater, the consistency of the slurry being suited to the method of coating and, of course, the life of the slurry being largely independent of the proportions of liquid and plaster therein. In using the set-accelerator, potassium sulfate, it matters little whether it dissolves in the slurry liquid as long as it is finely divided and uniformly mixed therein.

Where the mix is coated upon the backing promptly after the plaster is added to it (as, for example, in a continuous process as opposed to a batch process), ammonia alone can be used as in-process set-inhibitor.

It should be noted that when solutions of casein or boric acid in aqua ammonia are evaporated, the ammonium caseinate or ammonium borate in the solution are found as the original casein and boric acid since the ammonium salts decompose in the heating.

In regard to the cellulose ethers mentioned as previously used binders, they are specifically methyl cellulose, hydroxypropyl methyl cellulose and hydroxyethyl ethyl cellulose.

Since drying of the coated backing depends upon the type of dryer, the air circulation, temperature and many other factors it may be necessary to arbitrarily set the drying cycle so that, as stated, there is insufficient moisture left to cause setting of the finished product, as evidenced by the grittiness of the wetted bandage, but the drying should not be carried substantially beyond the point where no grittiness appears.

Having thus described my invention, what I claim is:

1. A plaster of Paris bandage in which the plaster of Paris particles are bonded to themselves and to the backing with from 1 to 15 percent of their weight, of an adhesive comprising polymerized and 85 to 100 percent hydrolyzed vinyl ester selected from the class consisting of acetate, propionate and butyrate, the degree of polymerization being such as to give a viscosity of from 3 to 70 centipoises in 4 weight percent aqueous solution at 20° C., as determined by the Hoeppler falling ball method.

2. The bandage of claim 1 in which the said adhesive is in the proportion of 1 to 5 percent of the weight of the plaster of Paris.

3. The bandage of claim 2 in which the said adhesive comprises vinyl acetate polymerized to a degree corresponding to a viscosity of 25 to 35 centipoises as determined by the said method and with substantially 100 percent hydrolysis.

4. The bandage of claim 2 wherein the said viscosity is 70 centipoises as determined by the said method.

5. The bandage of claim 1 which also contains from 0.1 to 1 percent of the weight of plaster of Paris of a material selected from the class consisting of casein and boric acid and from 0.5 to 2.5 percent of the weight of plaster of Paris, of potassium sulfate in finely divided form.

6. The bandage of claim 1 wherein the adhesive is a mixture of the said adhesive with ethylated starch.

7. The method of making a plaster of Paris bandage which comprises the steps of: (1) making an aqueous solution of an adhesive comprising polymerized and 85 to 100 percent hydrolyzed vinyl acetate whose degree of polymerization is such as to give a viscosity of from 3 to 70 centipoises in 4 weight percent aqueous solution at 20° C. as determined by the Hoeppler falling ball method, by heating at not over about 212° F. and stirring said adhesive in sufficient water to yield a solution containing not over about 30 percent by weight of said adhesive; (2) cooling the solution of step (1) to room temperature and mixing it with sufficient 29.4 weight percent aqua ammonia to give a concentration of from 8 to 23 percent $NH_3$ be weight; (3) dissolving in the product of step (2) from 0.1 to 1 percent of the weight of plaster of Paris to be used, of a material selected from the class consisting of casein and boric acid and adding from 0.5 to 2.5 percent of the weight of plaster of Paris to be used, of powdered potassium sulfate; (4) mixing with the product of step (3) sufficient powdered plaster of Paris so that the amount of the said adhesive of step (1) is from 1 to 15 percent of the weight of the plaster of Paris; (5) coating the product of step (4) upon a porous, flexible, inert backing material in amount such that a 4 inch by 5 yard area of the final, dry product weighs from about 208 to 250 grams; (6) drying the product of step (5) at a temperature of from 190° to 235° F. until but not substantially beyond where after it is held at room temperature for a few hours protected from moisture, no grittiness can be detected when it is wet in water and formed into a cast.

8. The method of claim 7 wherein the said solution of step (1) contains not over 20 percent by weight of said adhesive.

9. The method of claim 8 wherein the said vinyl acetate of step (1) is substantially 100 percent hydrolyzed and the viscosity of said adhesive of step (1) is 25 to 35 centipoises as determined by the said method.

10. The method of claim 9 wherein the said viscosity is 70 centipoises, as determined by the said method.

11. The method of claim 10 wherein the said adhesive of the said step (4) is from 1 to 5 percent of the weight of the said plaster of Paris.

12. The bandage of claim 1 wherein the adhesive is a mixture of the said adhesive with at least one material selected from the class consisting of cooked starch, dextrin, methyl cellulose, hydroxypropyl methyl cellulose and hydroxyethyl ethyl cellulose.

* * * * *

UNITED STATES PATENT OFFICE
CERTIFICATE OF CORRECTION

Patent No. 3,649,319          Dated March 14, 1972

Inventor(s) David F. Smith

It is certified that error appears in the above-identified patent and that said Letters Patent are hereby corrected as shown below:

Column 2, Example 1, line 7, "grams" should read -- casein -- . Column 3, line 34, "be" should read -- by -- ; line 63, "appreciable" should read -- appreciably -- .

Signed and sealed this 31st day of October 1972.

(SEAL)
Attest:

EDWARD M. FLETCHER, JR.          ROBERT GOTTSCHALK
Attesting Officer                Commissioner of Patents